HENRY BRAUNHOLD.
Improvement in Fur-Boxes.
No. 116,145.　　　　　　　　　　　　Patented June 20, 1871.
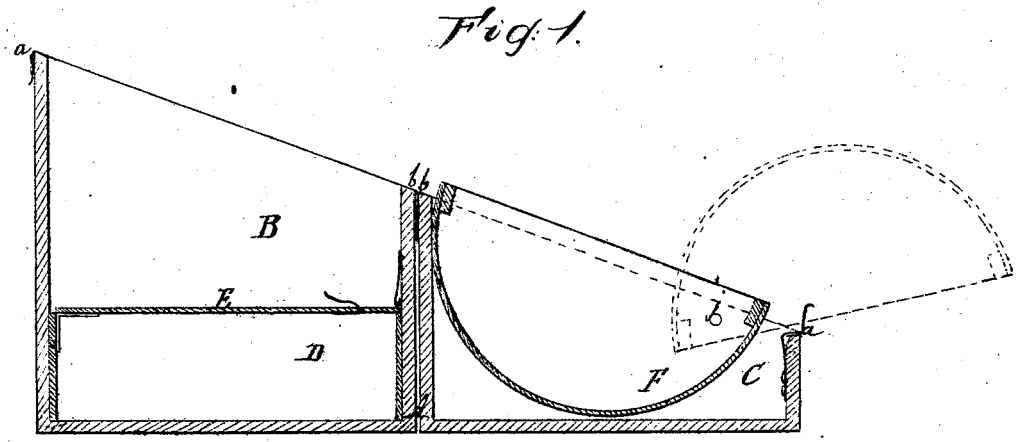
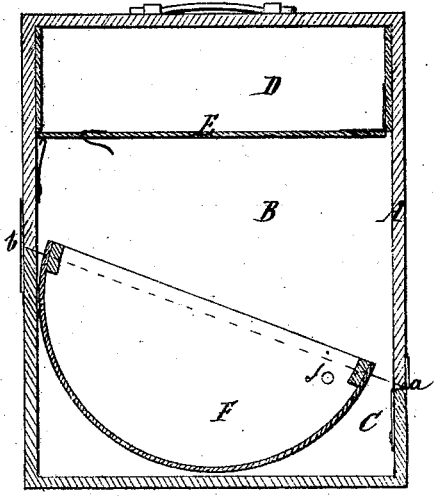
Inventor:
Henry Braunhold
per
Van Santvoord & Hauff
Attys
Witnesses:
C. Wahlers
L. Bilhuber 116,145

UNITED STATES PATENT OFFICE.

HENRY BRAUNHOLD, OF NEW YORK, N. Y.

IMPROVEMENT IN FUR-BOXES.

Specification forming part of Letters Patent No. 116,145, dated June 20, 1871.

*To all whom it may concern:*

Be it known that I, HENRY BRAUNHOLD, of the city, county, and State of New York, have invented a new and Improved Fur-Box; and I do hereby declare the following to be a full, clear, and exact description thereof, which will enable those skilled in the art to make and use the same, reference being had to the accompanying drawing forming part of this specification, in which drawing—

Figure 1 represents a longitudinal vertical section of my box when the same is open. Fig. 2 is a similar section of the same when closed.

Similar letters indicate corresponding parts.

This invention relates to a fur-box, provided in one part with a semi-cylindrical muff-receptacle, which is hinged at one end so that it can be swung out for the purpose of introducing camphor or other antiseptics in the compartment containing the muff-receptacle, the other part of the box being provided with a chamber for the reception of the collar. The box is cut in an oblique direction, so that when the same is thrown open the muff as well as the collar can be exhibited to good advantage.

In the drawing the letter A designates a box, which is cut in an oblique direction, following the line *a b*, said box being separated by the cut-in-two parts, viz., the head B and the base C, which are connected by a hinge-joint, *c*, of any suitable construction, and which are so proportioned that when the box is opened the edges of the head and base are situated in one and the same plane, as shown in Fig. 1. The head B is provided with a receptacle, D, for a fur collar, and this receptacle can be closed by a lid, E, hinged at one end and secured at the opposite end by a suitable button or catch. In the drawing I have shown the button *d*, which turns on a pivot, *e*, and by turning this button the lid E is released so that it can be opened. In the base C is secured a semi-cylindrical muff-receptacle, F, which is connected to the sides of the base near its front end by two pivots, *j*, so that it can be turned in to the position shown in full outlines in Fig. 1, or that it can be turned out to the position shown in dotted lines in said figure.

When the muff-receptacle is turned out easy access is had to the space beneath it, which is intended for the reception of camphor, carbolic acid, or other antiseptics capable of keeping out moths or other insects liable to injure fur. When the box is opened and the muff-receptacle is turned in the muff is exposed to view, and by hanging up the collar on the rear edge of the head B, the entire set of fur can be exhibited to great advantage in a show-window.

The box is closed by a spring-catch of any suitable construction.

What I claim as new, and desire to secure by Letters Patent, is—

A fur-box cut in an oblique direction, and containing in one part a reversible semi-cylindrical muff-receiver and in the other a covered collar-receptacle, substantially in the manner herein shown and described.

This specification signed by me this 18th day of May, 1871.

HENRY BRAUNHOLD.

Witnesses:
W. HAUFF,
E. F. KASTENHUBER.